Patented Dec. 2, 1952

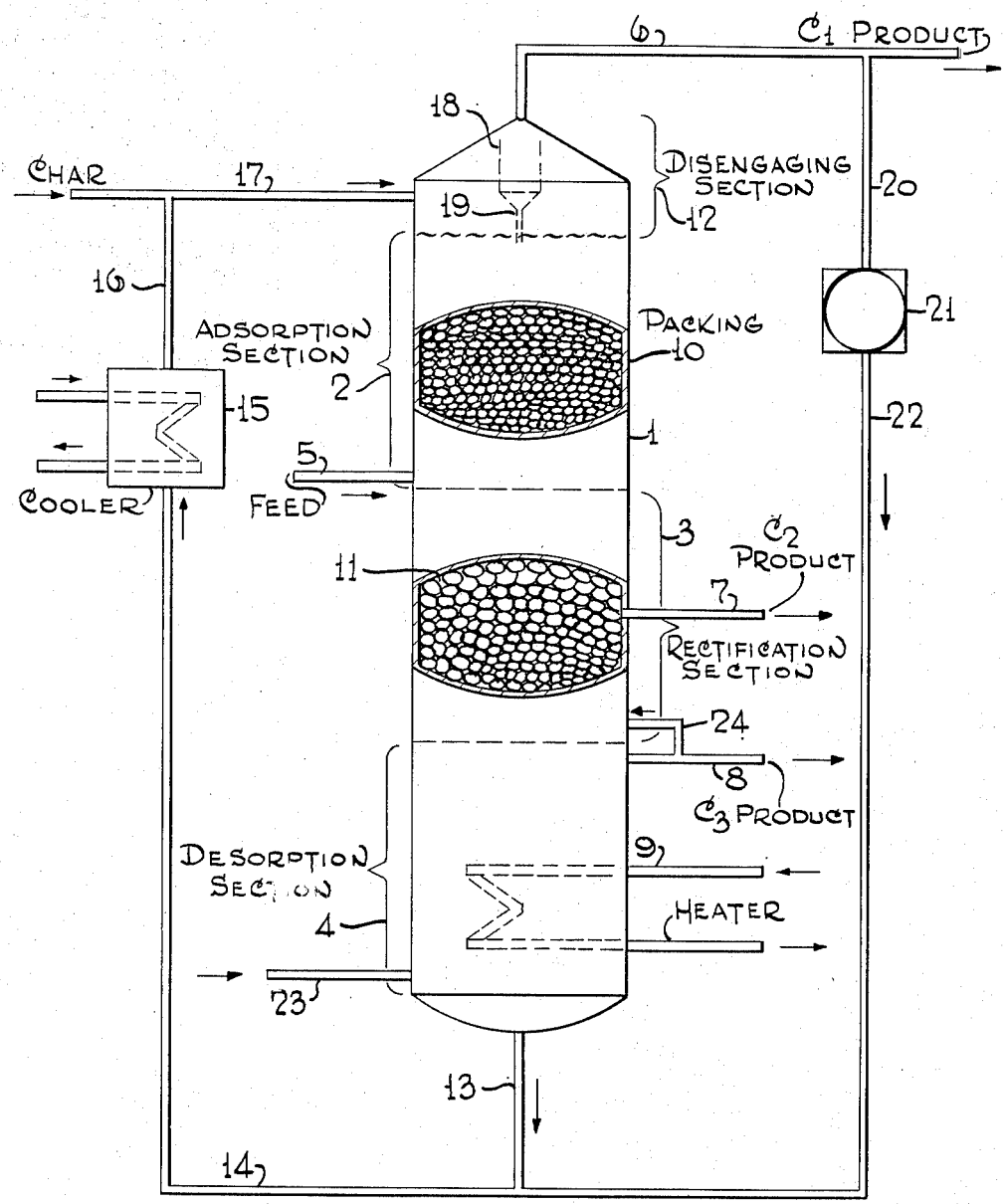

2,620,047

UNITED STATES PATENT OFFICE 2,620,047

ADSORPTION PROCESS

Robert P. Cahn, Elizabeth, N. J., assignor to Standard Oil Development Company, a corporation of Delaware Application September 8, 1950, Serial No. 183,768

7 Claims. (Cl. 183—114.2)

This invention relates to an improved process for separating fluid mixtures, particularly gaseous and liquid mixtures, by adsorption with a moving bed of solid adsorbents. More particularly, the process involves the improvement whereby stationary packing of solid adsorbent material of larger particle size than the moving adsorbent is employed at any point in the system where adsorption is occurring.

It is an object of this invention to increase the hold-up of adsorbent in a fluidized solids-absorption system.

It is an object of this invention to compensate for any sudden changes in feed composition to a fluidized solids-adsorption system or upsets in the steady operation thereof.

These and other objects of this invention are accomplished by carrying out the adsorption process in a tower filled at least in part with coarse packing consisting of comparatively large, stationary lumps of adsorbent material identical or similar in adsorption properties to the fluidized adsorbent circulating in the system.

The process of separating components of mixtures, both liquid and gaseous, by means of solid adsorbents has been well described. It is known that components of a mixture having varying degrees of adsorbability may be separated by contacting the mixture with a solid adsorbent whereby the more adsorbable component is adsorbed by the solid in preference to the less adsorbable component. The solid is then treated to recover the more adsorbable component therefrom in a process called desorption. The latter is usually accomplished by heat or stripping with steam or inert gas, or less usually by means of washing with a solvent for the adsorbed component.

It is well known that hydrocarbon mixtures, particularly gaseous mixtures, are separated into their components by treating them in intimate contact with solid adsorbents particularly activated carbon, silica gel, etc. In general it may be said that the activated carbons separate the hydrocarbons roughly by molecular weight, the higher molecular weight components of the hydrocarbon mixture being more strongly adsorbed by the carbon. On the other hand silica gel usually displays an affinity for the olefinic or more unsaturated type in preference to the less unsaturated or paraffinic type. Other adsorbents separate between isomers, e. g. silica gel is employed to separate toluene from methyl cyclohexane.

Recently a process has been developed whereby hydrocarbon gases are separated into their components by countercurrently treating the gases with finely-divided fluidized granular solid such as finely-divided activated carbon. In this process the granular solid containing adsorbed gases is generally heated and stripped with steam or inert gas such as $N_2$, to recover the adsorbed fractions. This heating is acomplished usually by indirect heat exchange, the heat being supplied by condensing Dowtherm vapors, by hot combustion gases or the like.

In the fluidized adsorption process in which the gas being separated is fed countercurrently to the fluidized solid adsorbent it sometimes happens that sudden changes occur in the composition of the gaseous feed to the unit producing a sudden upset in operation of the process. For example, a sudden increase in the concentration of the heavier component of the mixture will upset the system and cause a loss of this heavy material in the overhead from the unit resulting in undesirable contamination. Should the concentration of the light component of the mixture suddenly increase some of the light material will be incompletely separated and appear in the bottoms product. Similarly changes in the total amount of gaseous feed to the unit results in upset adsorption conditions.

These situations are remedied by filling all or part of the adsorption tower between the product draw-off streams with a coarse packing of comparatively large, non-fluidized, stationary lumps of solid adsorbent identical or similar in adsorption properties to the fluidized adsorbent circulating in the system. In actual amount the packing will be several times the quantity of fluidized adsorbent in the tower at any time.

Under steady conditions the quantity per unit weight of solid as well as the composition of the adsorbate on both the packing and the fluid adsorbent will be identical and constant at any point in the tower, provided the fluidized and stationary adsorbent are identical. If different, a steady state equilibrium will exist between the fluidized solid, the packing and the process stream at any point. However, as related above, on changing feed conditions or other operating conditions the system will have a longer period of time to readjust itself to the new conditions. This is possible due to the increased hold-up of the fluidized material in the column and due to the adsorptive nature of the packing which serves as a reservoir to hold back components of the mixture which due to upset conditions, tend to proceed in a direction contrary to their normal course.

This invention is applicable to the separation of normally gaseous or vaporizable liquid components of a mixture as well as liquids and is employed with any solid adsorbent material capable of being finely divided and fluidized, or formed into a slurry with a liquid.

The invention is generally applicable to fractionation processes involving selective adsorption of one or more components from a mixture containing other components which are more and less readily adsorbed. In such operations it is used to separate hydrocarbon mixtures into fractions of different boiling range or chemical structure by suitable selection of adsorbents in conformity with chromatographic principles. For example, paraffins, naphthenes, olefins, diolefins and aromatic hydrocarbons may be obtained as separate fractions from mixtures of two or more of these classes of hydrocarbons with silica gel adsorbent used in this process in one or more stages according to the number of fractions to be separated. Similarly organic vapors of different degrees of polarity may also be separated by selective adsorption by any suitable solid adsorbent.

The process is particularly applicable to the recovery of methane, $C_2$, $C_3$ and higher hydrocarbons from refinery fuel gas; to the recovery of light ends from low pressure gases resulting from catalytic cracking; to the recovery of hydrocarbons and oxygenated compounds for hydrocarbon synthesis gas; to the separation of methane from nitrogen; to the recovery of acetylene from gases recovered from the Wulff process, and to the separation of illuminants, hydrogen sulfide and light oil fractions from coke oven gases.

Solid adsorbents employed in the process of this invention are activated carbons including those prepared from charcoals, cokes, etc., silica gel, chabasite, activated alumina magnesia, clays, Porocel, Alundum, ferric oxide, etc. Activated carbon and silica gel are preferred agents for the separation of hydrocarbons according to this process. However, the particular adsorbent is chosen according to the separation desired which is dictated by the ability of the adsorbent to selectively adsorb a given material. The fluidized adsorbent is employed in particle size of approximately 50–200 microns and is fluidized in the adsorption process by the gas undergoing treatment. Superficial velocities of 0.02 to 5 ft. per second, preferably 0.3 to 3 ft. per second are employed.

The stationary packing adsorbent is a material of the same or relatively the same adsorption characteristics as the fluidized adsorbent. The packing may range in particle size from a minimum of ¼ inch diameter to a maximum of 12 inches diameter or larger. However, packing of ½ to 2 inches diameter particle size is preferred.

In accordance with this invention the adsorption section of the adsorption zone is at least partially filled with the solid non-fluidized packing or dispersing elements which are adequately spaced to provide a labyrinth of discontinuous passageways in which the fluidized adsorbent is in contact with the suspending gases. In other words the fluidized adsorbent flows like a liquid through the interstices formed by the non-fluidized packing elements. The packing serves to uniformly distribute the incoming gases through the entire cross section of the adsorption zone thus preventing local concentration of the incoming gases. Furthermore, localizing of high velocity of gases are prevented. By securing uniform distribution of the feed gases as well as uniform distribution of the adsorbent, more uniform operating conditions are obtained and uniform quality products secured. But more important is the action of the non-fluidized adsorbents in acting as a fly wheel to compensate for sudden changes in gas feed compositions as previously related. By maintaining non-fluidized packing in the upper section of the adsorption zone substantially complete removal of entrained fluidized particles is attained from the suspending gases leaving the adsorption zone.

It is within the scope of this invention to supply non-fluidized packing not only in the adsorption section but also in the rectification section of the adsorption system. In general packing can be employed at any place in the system between the points of withdrawal of product gases.

The employment of packing in the adsorption process may vary appreciably. The packing may be set into the top, the bottom or the entire section in random fashion, or the packing elements may be made to assume predetermined geometric patterns. The diameters and style of the packing elements may likewise vary depending upon the type of adsorber employed, the velocities used, the particular separation being carried out and the character and particle sizes of the solids being suspended. The packing elements should be so shaped and arranged within the zone in which they are employed so as to avoid extended horizontal surfaces on which the fluidized adsorbent particles can settle or slug. The zones may have packing elements of different sizes in the top and in the bottom sections of the vessel. For example, the upper section may be filled with relatively small packing elements and the bottom section be filled with coarser elements. In some cases it may be to advantage to reverse this procedure.

Where the space occupied by the packing is not an important factor the packing elements may be in the form of solid balls, spheres, cylinders, blocks, lumps, etc. However, where it is important to provide maximum adsorption space with minimum volume occupied by the packing, it is preferable to employ elements which give a maximum surface. There elements may for example be in the form of hollow cylinder U-shaped elements resembling saddles and the like. However, when the saddle-shaped elements are employed they should be designed to represent close nesting of one saddle in the other.

It is also within the scope of this invention to employ together with the non-fluidized adsorbent packing some inert packing having no adsorptive characteristics. The latter packing may be materials of heat conducting activity or heat insulating materials. In all instances the packing is so employed as to allow free passageway of the fluidized solid downwardly through the interstices thereof without becoming packed or agglomerated. In general it is a good rule to maintain interstices having a length as compared to diameter of not greater than 15:1. Also the packing should be at least about 10 times as large as the largest fluidized particle. Packing is provided in bubble cap towers, either on top, below or in between plates. If below or in between plates, only the gas will pass through the packing, as the char descends through the downcomers.

Suitable apparatus for use in this process is shown diagrammatically in the attached drawing. The single figure represents a sectional elevational view in part cross section of one type of apparatus adapted to carrying out the process of the invention. Referring to the drawing the invention will be described for purposes of example only by the separation of $C_1$, $C_2$ and $C_3$ hydrocarbons from a fraction comprising a mixture of $C_1$—$C_3$ and heavier hydrocarbons and less adsorbable gaseous components such as hydrogen and nitrogen by means of charcoal adsorption. The numeral 1 represents an adsorption column containing in descending order a tail gas removal line 6, an uppermost disengaging section 12, an adsorption section 2, a gas feed line 5, a rectification section 3, a $C_2$ vapor removal line 7, a desorption section 4, a $C_3$ and heavier vapor removal line 8, a heater 9 and a solids withdrawal line 13.

The adsorption section 2 is filled at least in part with large sized stationary particles 10 of non-fluidized charcoal, preferably of ¼ to 12 inches diameter in particle size, but preferably ½ to 2 inches in diameter. The fluidized adsorbent moves through the interstices 11 between the non-fluidized packing particles on its path through the zone. It may also be desirable in some instances to install packing in the rectification zone 3 at least in part. In general packing may be placed in any part of the column between the product draw-off streams. Packing employed at the upper portion of the adsorption section serves to entrain fluidized solid fines which would normally tend to make their way into the gas stream leaving the tower via line 6 in spite of the use of cyclone 18 in this section of the tower.

The feed gas containing a mixture of $C_1$—$C_3$ and heavier hydrocarbons and less adsorbable components such as hydrogen and nitrogen are introduced under pressure into the adsorption tower via line 5, at a point near the base of the adsorption section immediately above the rectification section. A mass of fluidized charcoal of 20–200 micron particle size and cooled to approximately 120–200° F. is introduced via line 17 into the top of the adsorption section of the tower at the disengaging section. The adsorbent passes down the tower between the interstices of the non-fluidized packing at such a rate that substantially all the $C_2$ and heavier hydrocarbons are selectively adsorbed on the charcoal within the adsorption section, while the methane and the lighter components, namely, hydrogen and nitrogen are unadsorbed and pass overhead through cyclone 18 and leave the tower via line 6. Entrained charcoal separated from the gas in cyclone 18 is returned to the tower via dip leg 19. The fluidized charcoal containing adsorbed components passes down the column into rectification section 3 below the feed point 5. In the upper part of this section any amounts of methane, nitrogen, hydrogen, etc. which may have remained on the charcoal as it passes down through the tower are desorbed by the reflux action of the more adsorbable, upwardly rising $C_2+$ hydrocarbon vapors which have been desorbed from the adsorbent at lower points in the rectification section and in the desorber 4. The displaced less readily adsorbed materials flow upwardly past the gas feed line 5 into the adsorption section and are eventually withdrawn from the system via line 6.

In the lower area of the rectification section the charcoal is refluxed with the heavier components of the feed, for example, the $C_3$ and heavier hydrocarbons similarly released in the desorption section by the action of heat supplied through heater 9. In this reflux action desorption of the $C_2$ hydrocarbons is effected and these are removed as a vapor stream via line 7. This stream contains controlled amounts of methane and unavoidable equilibrium amounts of $C_3$ and heavier hydrocarbons. The temperature of the gas product at this point is approximately 200–240° F. The fluidized charcoal substantially free of $C_2$ and lighter components passes from the rectification section into desorption section 4 containing the heating coil 9. In the desorber, desorption of $C_3$ and heavier hydrocarbons is accomplished by means of the action of the heat supplied by heater 9 and/or the assistance of stripping vapor such as steam supplied via line 23. The action of the heat and stripping gas disengages the $C_3$ and heavier hydrocarbons from the adsorbent. These hydrocarbons pass as a vapor upwardly through the desorption section and are removed as a vapor product together with the stripping gas via line 8 at a temperature of about 350° F. Part of this product is returned as reflux vapor to the bottom of the rectification section via line 24 preferably after being dried.

Additional side-streams representing one or more intermediate cuts may be obtained by expanding the rectification section and removing in addition to a more concentrated $C_3$ product heavier hydrocarbons such as $C_4$ and $C_5$ streams at lower points, heaviest material being removed from the top of the desorption section.

The hot stripped charcoal from the desorber section 4 at a temperature of 500° F. is removed via line 13 and circulated via gas lift line 14 with the assistance of tail gas which has been removed from the light product stream via line 20, repressured by blower 21 and brought into contact with the char via line 22. The hot char is lifted into cooler 15 in which it is cooled to a temperature in the range of 120–200° F. The cooled char emerges from the cooler via line 16 and is re-introduced into the top of the column at the disengaging section via line 17. In the disengaging section the recycled tail gas employed as lift gas plus the net tail gas overhead from the adsorption zone are removed via line 6, while the charcoal descends into the tower to repeat the cycle.

It is understood that during the adsorption-desorption cycle some of the fluidized charcoal adsorbent will become deactivated thus requiring regeneration. The regeneration is carried out by conventional means and is not a part of this invention.

During the adsorption process described the non-fluidized solid packing acts as a fly wheel to compensate for sudden changes in concentration of the feed components since the amount of fluidized charcoal circulated in the system is to some extent dependent upon the concentration of the various components of the feed. It is essential that the system be kept in equilibrium since the circulation of excessive amounts of char to compensate for changes in the feed is expensive and a difficult control problem arises if these upsets are sharp and of relatively short duration. The non-fluidized packing adsorbent tends to adsorb excess quantities of a given component over that present in the normal feed for which the particular column was designed. In this manner the system is restored to balance without contamination of the various product streams.

The fly wheel action of the solid packing takes place in the following manner. When the heavy components in the feed increase, the packing in the adsorption section will adsorb the excess and prevent exit of the heavy components with the top product, namely the light components. When the system returns to normal, the excess heavy components will slowly vaporize off the packing and will be picked up by moving adsorbent and carried down into the rectification section. Similarly, should the heavy components in the feed decrease, this material would be vaporized off the solid packing in the rectification zone and supply additional reflux vapor of heavy components to displace the lighter components from the moving descending adsorbent, thus preventing contamination of the bottoms product with the light components. On return to normal conditions, the packing in the rectification section will again readsorb its normal share of heavy components. Thus the packing in either case will slowly return to steady state adsorbate content after an upset system has returned to normal.

In the neighborhood of the feed point the packing may become deactivated due to heavy components ($C_{5+}$) in the feed. However, in the upper part of the adsorption section, these contaminants will not be present. Similarly, in the lower part of the rectification section, these contaminants will have been deposited on the fluidized solids and the only heavier components on the char packing will be those in equilibrium with the gas stream, i. e. strippable $C_4$'s and $C_5$'s, which are relatively harmless.

The principle of this invention may also be applied to the operation of a side-stream adsorber. The latter is adequately described in U. S. Patent 2,495,842. The side-stream adsorber operates to produce a highly purified intermediate product. For example, it operates as a separate adsorption zone to completely remove $C_3$ hydrocarbons from $C_2$ hyrocarbons. Thus a vapor stream of intermediate purity comprising $C_2$ and $C_3$ hydrocarbons is fed to the side-stream adsorber which is packed with solid stationary packing, as previously described for the adsorption section proper. A circulating adsorbent comparatively free of $C_3$ hydrocarbons is fed to the top of the side-stream adsorber while the vapor stream is introduced into the bottom thereof. A purified $C_2$ product is removed from the top of the tower while the adsorbent richer in $C_3$ component is returned to the rectification section of the main adsorption tower.

What is claimed is:

1. In the separation of components of a fluid mixture by means of selective adsorption employing a finely divided moving solid adsorbent of 50 to 200 microns particle size in which the fluid mixture is contacted countercurrently with the downwardly moving solid adsorbent in an adsorption zone, the improvement which comprises maintaining in at least part of the adsorption zone during the adsorption relatively larger particles of solid, stationary packing at least one-quarter inch in diameter and having relatively the same adsorption characteristics as the moving adsorbent.

2. A process according to claim 1 in which the fluid mixture is a mixture comprising normally gaseous hydrocarbons of the $C_1$—$C_3$ range and in which the solid moving adsorbent is fluidized activated carbon.

3. A process according to claim 1 in which both the moving adsorbent and the stationary adsorbent are activated carbon.

4. A process for separating a fluid mixture containing less readily and more readily adsorbed components with respect to a finely divided solid fluidized adsorbent of 50 to 200 microns particle size which comprises contacting the fluid mixture countercurrently with the downwardly moving fluidized solid adsorbent in an adsorption zone, passing the fluidized solid adsorbent successively from the adsorption section into a rectification zone and into a desorption zone, maintaining in the adsorption and rectification sections relatively larger particles of solid non-fluidized stationary packing at least one-quarter inch in diameter and having relatively the same adsorption characteristics as the fluidized adsorbent, recovering the less readily adsorbent component of the mixture from an upper section of the adsorption zone, and recovering the more readily adsorbent component from the enriched fluidized adsorbent in the desorption zone.

5. A process for separating a gaseous mixture containing less readily and more readily adsorbed components with respect to a finely divided solid fluidized adsorbent of 50 to 200 microns particle size which comprises contacting the gaseous mixture countercurrently with the downwardly moving fluidized solid adsorbent in an adsorption zone, passing the fluidized solid adsorbent successively from the adsorption section into a rectification zone and into a desorption zone, maintaining in the adsorption and rectification sections relatively larger particles of solid non-fluidized stationary packing at least one-quarter inch in diameter and having relatively the same adsorption characteristics as the fluidized adsorbent, recovering the less readily adsorbent component of the mixture from an upper section of the adsorption zone, and recovering the more readily adsorbent component from the enriched fluidized adsorbent in the desorption zone.

6. A process for separating a gaseous hydrocarbon mixture containing methane, $C_2$ and $C_3$ hydrocarbons by means of adsorption by a finely divided fluidized solid adsorbent of 50 to 200 microns particle size which comprises, passing said fluidized adsorbent downwardly through an adsorption zone having an adsorption section above the gaseous mixture feed point, a middle rectification section and a lower desorption section below the gaseous mixture feed point, maintaining in the adsorption section and in the rectification section relatively larger particles of solid, non-fluidized stationary packing at least one-quarter inch in diameter and having relatively the same adsorption characteristics as the fluidized adsorbent and through the interstices of which the fluidized adsorbent passes, feeding the gaseous mixture to a lower portion of the adsorption section, removing unadsorbed methane from an upper portion of the adsorption section, passing the fluidized adsorbent containing adsorbed thereon substantially $C_2$ and $C_3$ hydrocarbons into the rectification zone wherein the adsorbent is refluxed with $C_3$ hydrocarbon vapors rising from the desorption section, removing a vapor stream of $C_2$ hydrocarbons from the rectification section, passing the adsorbent containing substantially $C_3$ hydrocarbons adsorbed thereon from the rectification section into the desorption section, and recovering a vapor stream of $C_3$ hydrocarbons from the desorption section by application of heat to the adsorbent therein.

7. A process according to claim 6 in which both the fluidized adsorbent and the non-fluidized packing are activated carbon.

ROBERT P. CAHN.

REFERENCES CITED

The following references are of record in the file of this patent:

UNITED STATES PATENTS

| Number | Name | Date |
|---|---|---|
| 2,443,673 | Atwell | June 22, 1948 |
| 2,519,873 | Berg | Aug. 22, 1950 |
| 2,523,149 | Scheeline | Sept. 19, 1950 |